(12) United States Patent
Sasaki et al.

(10) Patent No.: US 9,792,929 B1
(45) Date of Patent: Oct. 17, 2017

(54) MAGNETIC HEAD FOR PERPENDICULAR MAGNETIC RECORDING INCLUDING A COIL HAVING AN INCLINED SURFACE

(71) Applicants: Yoshitaka Sasaki, Los Gatos, CA (US); Hiroyuki Ito, Milpitas, CA (US); Kazuki Sato, Milpitas, CA (US); Yukinori Ikegawa, Milpitas, CA (US); Shigeki Tanemura, Milpitas, CA (US); Hironori Araki, Milpitas, CA (US)

(72) Inventors: Yoshitaka Sasaki, Los Gatos, CA (US); Hiroyuki Ito, Milpitas, CA (US); Kazuki Sato, Milpitas, CA (US); Yukinori Ikegawa, Milpitas, CA (US); Shigeki Tanemura, Milpitas, CA (US); Hironori Araki, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 15/438,258

(22) Filed: Feb. 21, 2017

(51) Int. Cl.
  *G11B 5/17* (2006.01)
  *G11B 5/31* (2006.01)
(52) U.S. Cl.
  CPC ............ *G11B 5/17* (2013.01); *G11B 5/313* (2013.01); *G11B 5/3123* (2013.01)

(58) Field of Classification Search
  None
  See application file for complete search history.

(56) References Cited

U.S. PATENT DOCUMENTS

| 8,345,381 | B1* | 1/2013 | Sasaki | G11B 5/17 360/123.03 |
|---|---|---|---|---|
| 8,385,019 | B1* | 2/2013 | Sasaki | G11B 5/1278 360/123.03 |
| 8,810,963 | B1 | 8/2014 | Sasaki et al. | |
| 9,653,100 | B1* | 5/2017 | Sasaki | G11B 5/1278 |
| 2016/0275970 | A1 | 9/2016 | Sasaki et al. | |

\* cited by examiner

*Primary Examiner* — Will J Klimowicz
(74) *Attorney, Agent, or Firm* — Oliff PLC

(57) ABSTRACT

A magnetic head includes a medium facing surface, a coil, a main pole, a write shield, and a first and a second return path section. The first return path section is located on the leading side of the main pole. The coil includes a specific coil element passing through a space defined by main pole, a gap section, write shield and first return path section. The main pole has a bottom end including a first portion and a second portion, the second portion being farther from medium facing surface than is the first portion. The specific coil element has a rear end farthest from medium facing surface. The distance from medium facing surface to rear end of the specific coil element is smaller than or equal to the distance from the medium facing surface to the boundary between the first portion and the second portion.

6 Claims, 11 Drawing Sheets

MAGNETIC HEAD FOR PERPENDICULAR MAGNETIC RECORDING INCLUDING A COIL HAVING AN INCLINED SURFACE

BACKGROUND OF THE INVENTION

1. Field of the Invention

The present invention relates to a magnetic head for perpendicular magnetic recording for use to write data on a recording medium by means of a perpendicular magnetic recording system.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit including a magnetoresistive element (hereinafter, also referred to as MR element) for reading and a write head unit including an induction-type electromagnetic transducer for writing are stacked on a substrate. The write head unit includes a coil and a main pole. The main pole has an end face located in a medium facing surface configured to face a recording medium. The coil produces a magnetic field corresponding to data to be written on the recording medium. The main pole passes a magnetic flux corresponding to the magnetic field produced by the coil, and produces a write magnetic field from its end face.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

Particularly, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide-area track erasure (WATE). To achieve higher recording densities, it is necessary to prevent the occurrence of unwanted erasure.

In order to prevent the occurrence of unwanted erasure induced by a skew and achieve higher recording densities, it is effective to configure the main pole so that the thickness of its portion near the medium facing surface decreases with increasing proximity to the medium facing surface, and also provide a write shield that has an end face located in the medium facing surface and surrounding the end face of the main pole.

In a magnetic head including the write shield, there is typically provided a return path section for connecting the write shield to a portion of the main pole located away from the medium facing surface. The write shield, the return path section and the main pole define a space for a portion of the coil to pass therethrough. The write shield and the return path section have the function of capturing a magnetic flux that is produced from the end face of the main pole and spreads in directions other than a direction perpendicular to the plane of the recording medium, thereby preventing the magnetic flux from reaching the recording medium. The write shield and the return path section further have the function of allowing a magnetic flux that has been produced from the end face of the main pole and has magnetized a portion of the recording medium to flow back to the main pole.

With increases in frequency of write signals to achieve higher recording densities, it is required of the magnetic head that the write current flowing through the coil should exhibit a rapid rise. To meet such a requirement, it is effective to reduce the length of a magnetic path that passes through the write shield, the return path section and the main pole. To achieve this, it is effective to reduce the distance between the medium facing surface and an end of the coil that is closest to the medium facing surface.

A magnetic head in which the write shield includes a leading shield and a trailing shield is known to be suitable to prevent the occurrence of unwanted erasure induced by a skew. Such a magnetic head includes a leading-side return path section connected to the leading shield, and a trailing-side return path section connected to the trailing shield. The leading-side return path section and the main pole define a first space therebetween. The trailing-side return path section and the main pole define a second space therebetween. The coil includes at least one first coil element passing through the first space, and at least one second coil element passing through the second space. The magnetic head of such a structure is disclosed in, for example, U.S. Pat. No. 8,810,963 B1 and US 2016/0275970 A1.

In order for the magnetic head of the foregoing structure to achieve higher recording density while minimizing leakage of magnetic flux from some midpoint in the main pole, it is effective to provide the the main pole with a bottom end including an inclined portion, as disclosed in U.S. Pat. No. 8,810,963 B1 and US 2016/0275970 A1. The inclined portion has a first end located in the medium facing surface and a second end opposite thereto. The inclined portion is inclined with respect to the medium facing surface and a direction perpendicular to the medium facing surface such that the second end is located on the leading side relative to the first end.

However, there are the following first and second problems with the structure disclosed in U.S. Pat. No. 8,810,963 B1 and US 2016/0275970 A1. The first problem is leakage of magnetic flux from the main pole to the leading-side return path section. The second problem is that a magnetic path passing through the leading shield, the leading-side return path section and the main pole is longer than a magnetic path passing through the trailing shield, the trailing-side return path section and the main pole.

SUMMARY OF THE INVENTION

It is an object of the present invention to provide a magnetic head for perpendicular magnetic recording that eliminates or reduces the occurrence of unwanted erasure induced by a skew, eliminates or reduces leakage of magnetic flux from the main pole to the return path section, and reduces the length of the magnetic path passing through the write shield, the return path section and the main pole.

A magnetic head for perpendicular magnetic recording of the present invention includes: a medium facing surface configured to face a recording medium; a coil for producing a magnetic field corresponding to data to be written on the recording medium; a main pole; a write shield formed of a magnetic material; a gap section formed of a nonmagnetic material; a first return path section formed of a magnetic material; a second return path section formed of a magnetic material; and a substrate having a top surface.

The main pole has an end face located in the medium facing surface. The main pole is configured to pass a magnetic flux corresponding to the magnetic field produced by the coil, and to produce a write magnetic field for use to write data on the recording medium by means of a perpendicular magnetic recording system. The write shield has an end face located in the medium facing surface. The gap section is located between the main pole and the write shield. The coil, the main pole, the write shield, the gap section, the first return path section and the second return path section are located above the top surface of the substrate.

The first return path section is located closer to the top surface of the substrate than is the main pole, and connects the write shield to part of the main pole located away from the medium facing surface so that a first space is defined by the main pole, the gap section, the write shield and the first return path section.

The second return path section is located farther from the top surface of the substrate than is the main pole, and connects the write shield to part of the main pole located away from the medium facing surface so that a second space is defined by the main pole, the gap section, the write shield and the second return path section.

The end face of the write shield includes a first end face portion and a second end face portion, the first end face portion being located closer to the top surface of the substrate than is the end face of the main pole, the second end face portion being located farther from the top surface of the substrate than is the end face of the main pole.

The coil includes at least one first coil element extending to pass through the first space, and at least one second coil element extending to pass through the second space.

The main pole has a bottom end facing toward the top surface of the substrate. The bottom end of the main pole includes a first portion and a second portion arranged in this order, the second portion being farther from the medium facing surface than is the first portion. The first portion has a first end located in the medium facing surface, and a second end located at the boundary between the first portion and the second portion. The first portion is inclined with respect to the medium facing surface and a direction perpendicular to the medium facing surface such that the second end is located closer to the top surface of the substrate than is the first end. The distance from the top surface of the substrate to any point in the second portion is greater than or equal to the distance from the top surface of the substrate to the second end.

The at least one first coil element includes one specific first coil element. The specific first coil element has a first front end closest to the medium facing surface, a first rear end farthest from the medium facing surface, and a first inclined surface contiguous with the first front end. The first inclined surface has a third end closest to the medium facing surface and a fourth end farthest from the medium facing surface. The first inclined surface is inclined with respect to the medium facing surface and the direction perpendicular to the medium facing surface such that the fourth end is located closer to the top surface of the substrate than is the third end. The distance from the medium facing surface to the first rear end of the specific first coil element is smaller than or equal to the distance from the medium facing surface to the second end of the first portion.

In the magnetic head of the present invention, the at least one second coil element may include one specific second coil element. The specific second coil element may have a second front end closest to the medium facing surface, a second rear end farthest from the medium facing surface, and a second inclined surface contiguous with the second front end, the second inclined surface being located farther from the top surface of the substrate than is the second front end. The second inclined surface has a fifth end closest to the medium facing surface and a sixth end farthest from the medium facing surface. The second inclined surface is inclined with respect to the medium facing surface and the direction perpendicular to the medium facing surface such that the sixth end is located farther from the top surface of the substrate than is the fifth end.

In the magnetic head of the present invention, the first return path section may include a yoke which is located closer to the top surface of the substrate than is the at least one first coil element, and a coupling section for magnetically coupling the yoke to the write shield. The coupling section may have a third inclined surface facing toward the first portion. The third inclined surface has a seventh end closest to the medium facing surface and an eighth end farthest from the medium facing surface. The third inclined surface is inclined with respect to the medium facing surface and the direction perpendicular to the medium facing surface such that the eighth end is located closer to the top surface of the substrate than is the seventh end. The first inclined surface may be opposed to the third inclined surface.

In the magnetic head of the present invention, the first inclined surface may be opposed to the first portion.

In the magnetic head of the present invention, the end face of the write shield may further include a third end face portion and a fourth end face portion. The third end face portion and the fourth end face portion are located on opposite sides of the end face of the main pole in the track width direction.

The magnetic head of the present invention may further include a read head unit and a middle shield, the read head unit being located closer to the top surface of the substrate than is the first return path section, the middle shield being formed of a magnetic material. The read head unit includes a first read shield layer, a magnetoresistive element and a second read shield layer which are arranged in this order, the first read shield layer being closest to the top surface of the substrate. The first and second read shield layers are both formed of a magnetic material. At least part of the middle shield is located between the second read shield layer and the first return path section.

In the magnetic head of the present invention, the end face of the write shield includes the first end face portion and the second end face portion, and the bottom end of the main pole includes the first portion. By virtue of this configuration, the present invention enables reduction or elimination of the occurrence of unwanted erasure induced by a skew. Further, in the present invention, the distance from the medium facing surface to the first rear end of the specific first coil element is smaller than or equal to the distance from the medium facing surface to the second end of the first portion. Thus, in the present invention, the specific first coil element is present between the first portion and the first return path section. As a result, the present invention enables reduction or elimination of leakage of magnetic flux from the main pole to the first return path section. Further, in the present invention, the specific first coil element has the first inclined surface. By virtue of this, the present invention enables reduction in length of the magnetic path passing through the write shield, the first return path section and the main pole.

Other objects, features and advantages of the present invention will become fully apparent from the following description.

DETAILED DESCRIPTION OF THE PREFERRED EMBODIMENTS

First Embodiment

Figure 2:
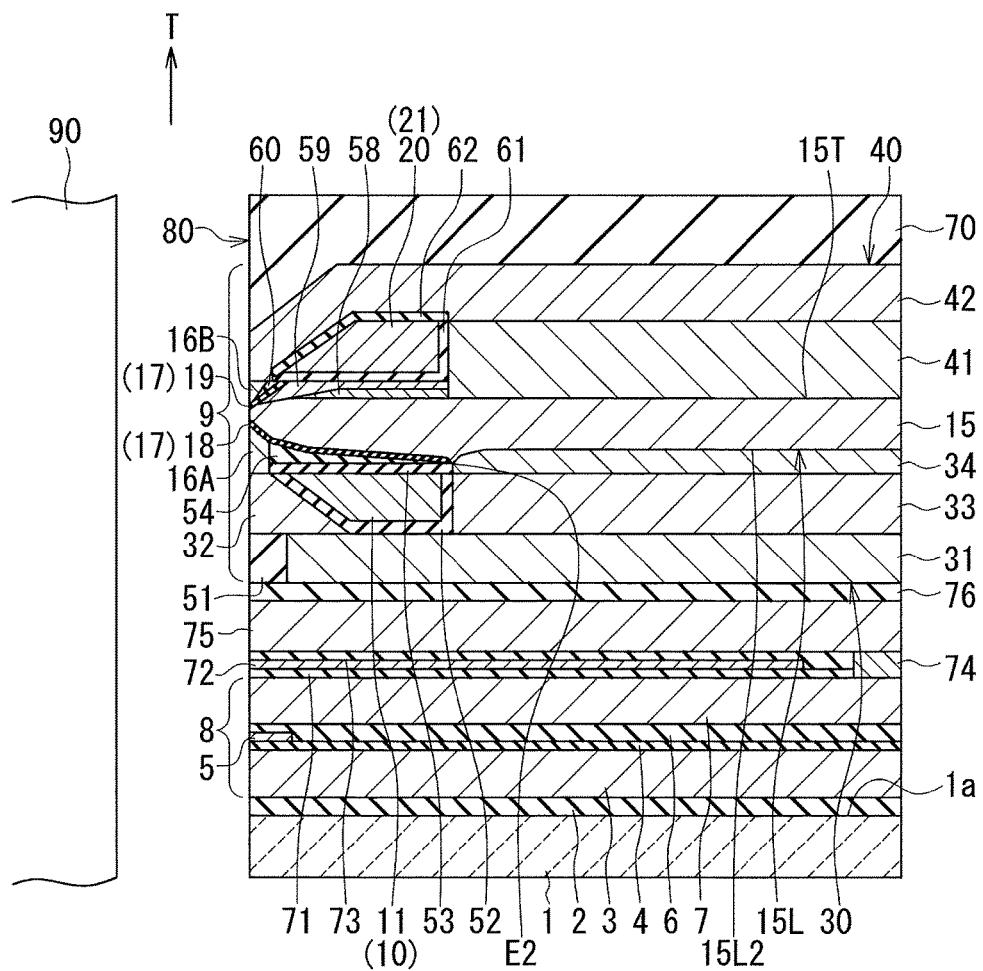
FIG. 2 is a cross-sectional view of the magnetic head according to the first embodiment of the invention.
Figure 3:
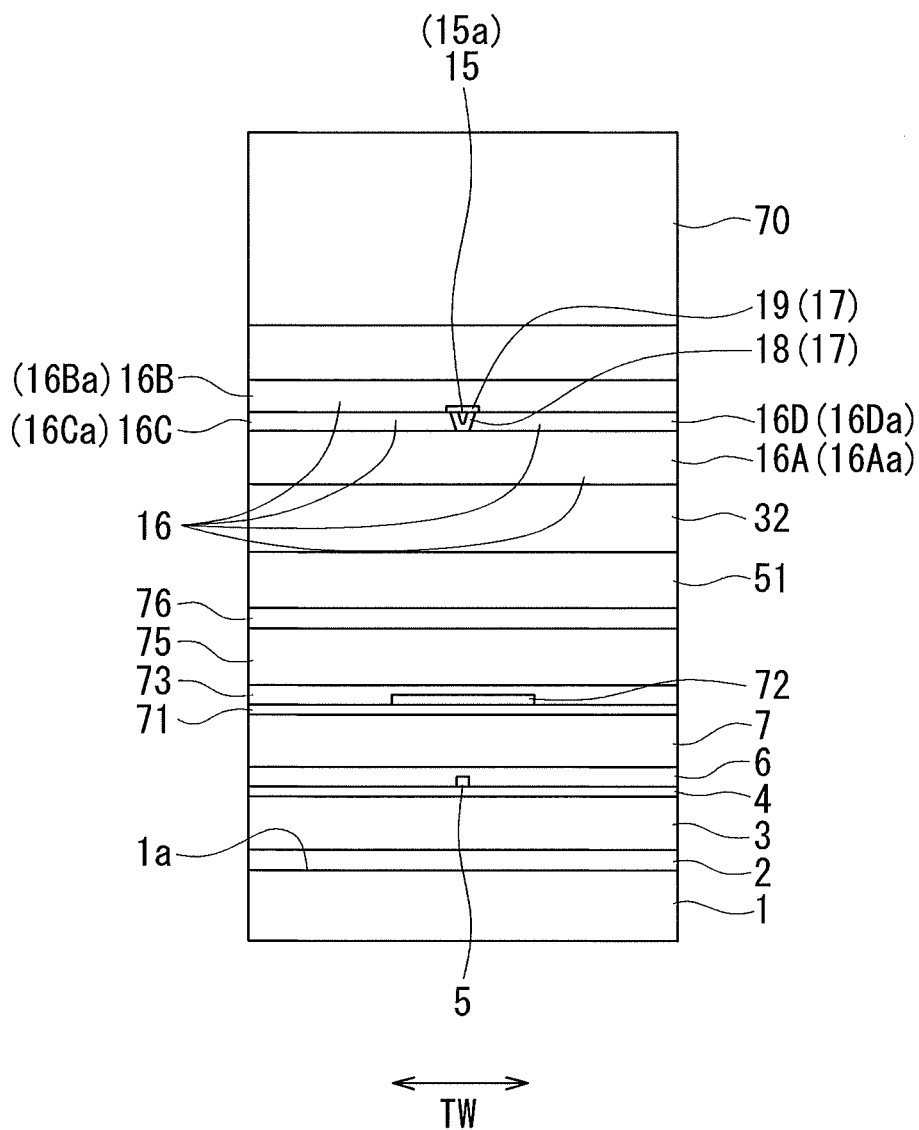
FIG. 3 is a front view showing the medium facing surface of the magnetic head according to the first embodiment of the invention.
Figure 4:
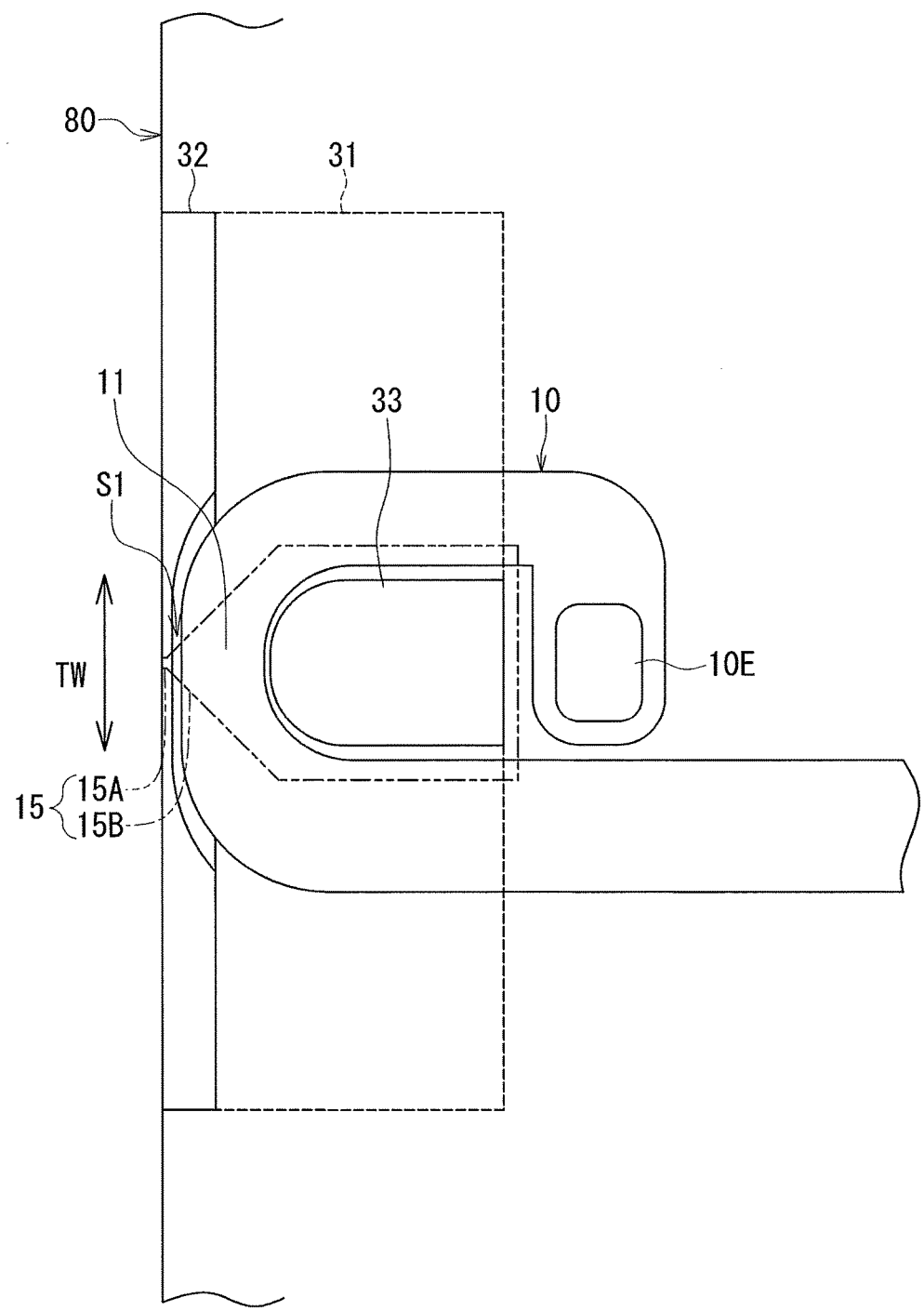
FIG. 4 is a plan view showing a first coil portion of the magnetic head according to the first embodiment of the invention.
Figure 5:
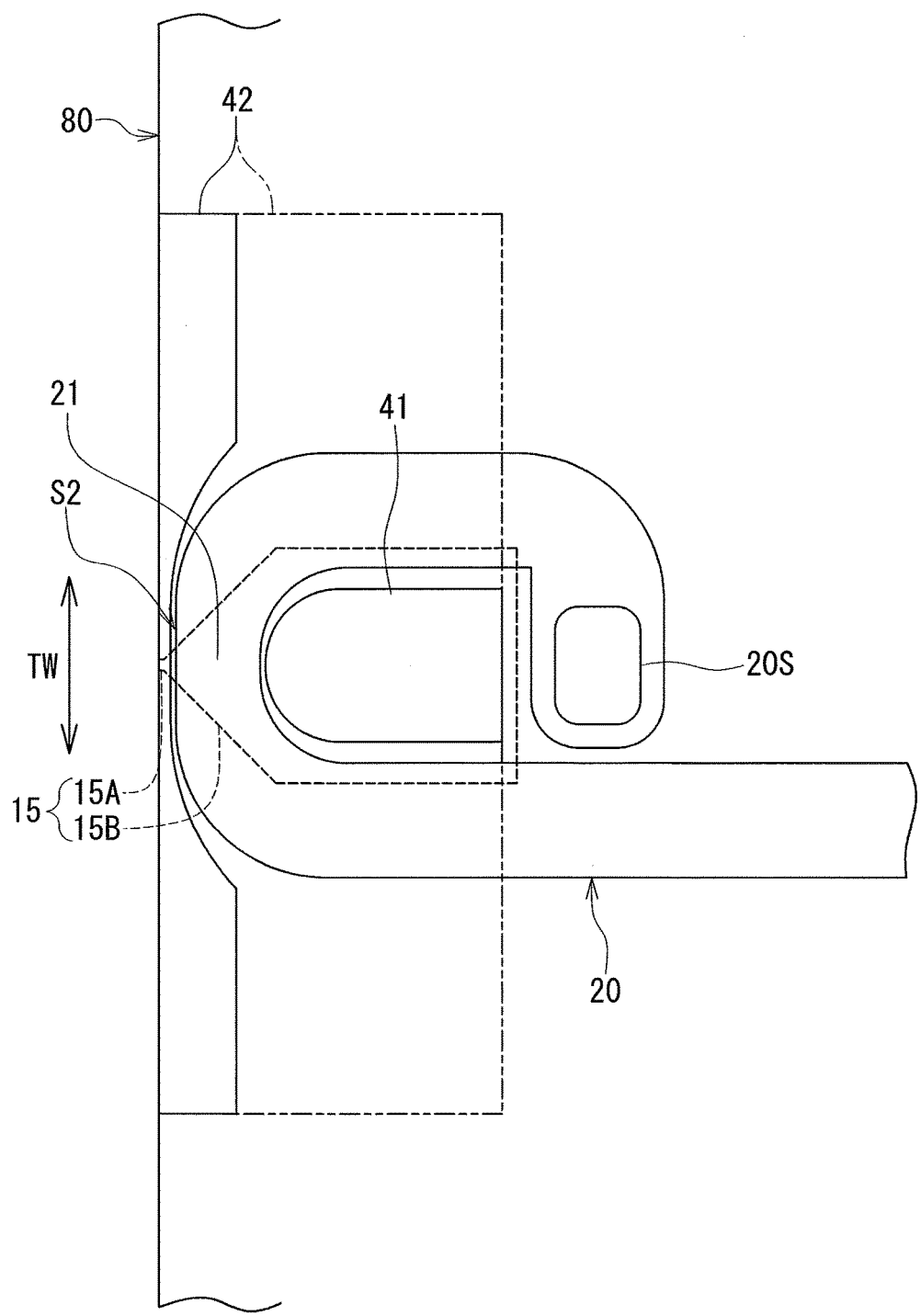
FIG. 5 is a plan view showing a second coil portion of the magnetic head according to the first embodiment of the invention.

Preferred embodiments of the present invention will now be described in detail with reference to the drawings. First, reference is made to FIG. 2 to FIG. 5 to describe the configuration of a magnetic head for perpendicular magnetic recording (hereinafter simply referred to as magnetic head) according to a first embodiment of the invention. FIG. 2 is a cross-sectional view of the magnetic head according to the present embodiment. The arrow T in FIG. 2 indicates the direction of travel of a recording medium. FIG. 3 is a front view showing the medium facing surface of the magnetic head according to the present embodiment. FIG. 4 is a plan view showing a first coil portion of the magnetic head according to the present embodiment. FIG. 5 is a plan view showing a second coil portion of the magnetic head according to the present embodiment. In FIG. 3 to FIG. 5, the arrow TW indicates the track width direction.

The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90. As shown in FIG. 2, the magnetic head has the medium facing surface 80.

Further, as shown in FIGS. 2 and 3, the magnetic head includes a substrate 1 having a top surface 1a. The substrate 1 is formed of a ceramic material such as aluminum oxide-titanium carbide ($Al_2O_3$—TiC).

For the positions of the components of the magnetic head, the term "above" as used herein refers to positions located in a direction that is perpendicular to the top surface 1a of the substrate 1 and away from the top surface 1a with respect to a reference position, and "below" refers to positions located in a direction that is perpendicular to the top surface 1a of the substrate 1 and toward the top surface 1a with respect to the reference position. For each of layers included in the magnetic head, the term "top surface" as used herein refers to the surface farther from the top surface 1a of the substrate 1.

The magnetic head further includes: an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and lying on the second read shield layer 7; a contact sensor 72 lying on the nonmagnetic layer 71; and a nonmagnetic layer 73 formed of a nonmagnetic material and disposed to cover the nonmagnetic layer 71 and the contact sensor 72. The nonmagnetic layers 71 and 73 are formed of alumina, for example. The contact sensor 72 will be described in detail later.

The magnetic head further includes: a middle shield 75 formed of a magnetic material and lying on the nonmagnetic layer 73; a magnetic layer 74 formed of a magnetic material and connecting the second read shield layer 7 and the middle shield 75; a nonmagnetic layer 76 formed of a nonmagnetic material and lying on the middle shield 75; and a write head unit 9 lying on the nonmagnetic layer 76. The magnetic layer 74 is located away from the medium facing surface 80 and embedded in the nonmagnetic layers 71 and 73. The middle shield 75 has the function of shielding the MR element 5 from magnetic fields generated in the write head unit 9. The nonmagnetic layer 76 is formed of alumina, for example.

The write head unit 9 includes a coil, a main pole 15, a write shield 16, and a gap section 17. The coil produces a magnetic field corresponding to data to be written on the recording medium 90. The coil includes a first coil portion 10 and a second coil portion 20. The first coil portion 10 and the second coil portion 20 are both formed of a conductive material such as copper. The first coil portion 10 and the second coil portion 20 are connected in series or in parallel. The main pole 15 has an end face 15a located in the medium facing surface 80. The main pole 15 is configured to pass a magnetic flux corresponding to the magnetic field produced by the coil, and to produce a write magnetic field for use to write data on the recording medium 90 by means of a perpendicular magnetic recording system. FIG. 2 shows a cross section that intersects the end face 15a of the main pole 15 and that is perpendicular to the medium facing surface 80 and to the top surface 1a of the substrate 1. Such a cross section will hereinafter be referred to as the main cross section.

The write shield 16 has an end face located in the medium facing surface 80. The end face of the write shield 16 includes a first end face portion 16Aa, a second end face portion 16Ba, a third end face portion 16Ca and a fourth end face portion 16Da. The first end face portion 16Aa is located closer to the top surface 1a of the substrate 1 than is the end face 15a of the main pole 15. The second end face portion 16Ba is located farther from the top surface 1a of the substrate 1 than is the end face 15a of the main pole 15. The third and fourth end face portions 16Ca and 16Da are located on opposite sides of the end face 15a of the main pole 15 in the track width direction TW. In the medium facing surface 80, the first to fourth end face portions 16Aa, 16Ba, 16Ca and 16Da arranged to surround the end face 15a of the main pole 15.

The write shield 16 is formed of a magnetic material. For example, the write shield 16 may be formed of one of CoFeN, CoNiFe, FeNi and CoFe.

The write head unit 9 further includes a first return path section 30 and a second return path section 40. The first and second return path sections 30 and 40 are both formed of a magnetic material. For example, the first and second return path sections 30 and 40 may each be formed of one of CoFeN, CoNiFe, FeNi and CoFe. The first return path section 30 is located closer to the top surface 1a of the substrate 1 than is the main pole 15 and connects the write shield 16 to part of the main pole 15 located away from the medium facing surface 80, thereby magnetically coupling the write shield 16 to the main pole 15. The second return path section 40 is located farther from the top surface 1a of the substrate 1 than is the main pole 15, and connects the write shield 16 to part of the main pole 15 located away from the medium facing surface 80, thereby magnetically coupling the write shield 16 to the main pole 15.

The first return path section 30 includes a yoke 31 and coupling sections 32, 33 and 34. The yoke 31 lies on the nonmagnetic layer 76. The coupling sections 32 and 33 lie on the yoke 31. The coupling section 32 is located near the medium facing surface 80. The coupling section 33 is located farther from the medium facing surface 80 than is the coupling section 32. The yoke 31 has an end face that faces toward the medium facing surface 80 and located at a distance from the medium facing surface 80. The coupling section 32 has an end face located in the medium facing surface 80.

As shown in FIG. 4, the first coil portion 10 is wound around the coupling section 33. The write head unit 9 further includes: an insulating layer 51 formed of an insulating material and lying on the nonmagnetic layer 76 to surround the yoke 31; an insulating film 52 formed of an insulating material and separating the first coil portion 10 from the yoke 31 and the coupling sections 32 and 33; and an insulating layer (not illustrated) formed of an insulating material and disposed around the first coil portion 10 and the coupling section 32. The top surfaces of the first coil portion 10, the coupling sections 32 and 33, the insulating film 52 and the non-illustrated insulating layer are even with each other. The insulating layer 51, the insulating film 52 and the non-illustrated insulating layer are formed of alumina, for example.

As shown in FIG. 3, the write shield 16 includes a bottom shield 16A, a top shield 16B, and two side shields 16C and 16D. The bottom shield 16A is located closer to the top surface 1a of the substrate 1 than is the main pole 15. The top shield 16B is located farther from the top surface 1a of the substrate 1 than is the main pole 15. The two side shields 16C and 16D are located on opposite sides of the main pole 15 in the track width direction TW, and magnetically couple the bottom shield 16A and the top shield 16B to each other.

As shown in FIG. 3, the bottom shield 16A includes the first end face portion 16Aa. The top shield 16B includes the second end face portion 16Ba. The side shield 16C includes the third end face portion 16Ca. The side shield 16D includes the fourth end face portion 16Da.

The bottom shield 16A lies on the coupling section 32. The coupling section 34 lies on the coupling section 33. The write head unit 9 further includes an insulating layer 53 formed of an insulating material, and a nonmagnetic layer 54 formed of a nonmagnetic material. The insulating layer 53 lies on the first coil portion 10, the insulating film 52 and the non-illustrated insulating layer. The nonmagnetic layer 54 lies on the insulating layer 53 and surrounds the bottom shield 16A and the coupling section 34. The insulating layer 53 and the nonmagnetic layer 54 are formed of alumina, for example.

The side shields 16C and 16D lie on the bottom shield 16A. The main pole 15 has the end face 15a, and further has: a bottom end 15L (see FIG. 2) facing toward the top surface 1a of the substrate 1; a top surface 15T (see FIG. 2) opposite to the bottom end 15L; and a first side part and a second side part opposite to each other in the track width direction TW (see FIG. 3). The side shield 16C has a first sidewall opposed to the first side part of the main pole 15. The side shield 16D has a second sidewall opposed to the second side part of the main pole 15.

The gap section 17 is located between the main pole 15 and the write shield 16. The write head unit 9 further includes a first gap layer 18 formed of a nonmagnetic material and including a portion that constitutes a portion of the gap section 17, and a second gap layer 19 formed of a nonmagnetic material and including a portion that constitutes another portion of the gap section 17. The portion of the first gap layer 18 constituting the portion of the gap section 17 is located between the main pole 15 and each of the bottom shield 16A and the side shields 16C and 16D. The portion of the second gap layer 19 constituting the other portion of the gap section 17 is located between the main pole 15 and the top shield 16B.

The first gap layer 18 is disposed to extend along the first and second sidewalls of the side shields 16C and 16D, the top surface of the bottom shield 16A and the top surface of the nonmagnetic layer 54. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18.

A portion of the main pole 15 lies above the top surfaces of the bottom shield 16A and the nonmagnetic layer 54. The first gap layer 18 is interposed between the aforementioned portion of the main pole 15 and the top surfaces of the bottom shield 16A and the nonmagnetic layer 54. As shown in FIG. 3, the first gap layer 18 is interposed also between the first side part of the main pole 15 and the first sidewall of the side shield 16C, and between the second side part of the main pole 15 and the second sidewall of the side shield 16D.

The bottom end 15L of the main pole 15 is in contact with the top surface of the coupling section 34 at a location away from the medium facing surface 80. The main pole 15 is formed of a ferromagnetic material containing one or more elements selected from the group consisting of Ni, Fe and Co, such as FeNi, CoNiFe, or CoFe. The shape of the main pole 15 will be described in detail later.

The write head unit 9 further includes a nonmagnetic layer (not illustrated) formed of a nonmagnetic material and disposed around the main pole 15 and the side shields 16C and 16D. The non-illustrated nonmagnetic layer is formed of alumina, for example.

The write head unit 9 further includes a first nonmagnetic layer 58 and a second nonmagnetic layer 59. The first nonmagnetic layer 58 is formed of a nonmagnetic material and lies on a first portion of the top surface 15T of the main pole 15, the first portion being located at a distance from the medium facing surface 80. The second nonmagnetic layer 59 is formed of a nonmagnetic material and disposed to cover the first nonmagnetic layer 58 and a second portion of the top surface 15T of the main pole 15, the second portion being near the medium facing surface 80. The second nonmagnetic layer 59 has an end that is closest to the medium facing surface 80 and located at a distance from the medium facing surface 80. For example, the first and second nonmagnetic layers 58 and 59 are each formed of a non-magnetic metal material such as Ru, NiCr or NiCu.

The second gap layer 19 is disposed to cover the main pole 15 and the second nonmagnetic layer 59. The material of the second gap layer 19 may be a nonmagnetic insulating material such as alumina, or a nonmagnetic conductive material such as Ru, NiCu, Ta, W, NiB, or NiP.

The write head unit 9 further includes a third nonmagnetic layer 60 formed of a nonmagnetic material and lying on the second gap layer 19. The third nonmagnetic layer 60 has an end that is closest to the medium facing surface 80 and located at a distance from the medium facing surface 80. The third nonmagnetic layer 60 is formed of alumina, for example.

The top shield 16B lies on the side shields 16C and 16D, the second gap layer 19 and the third nonmagnetic layer 60, and is in contact with the top surfaces of the side shields 16C and 16D, the second gap layer 19 and the third nonmagnetic layer 60. In the medium facing surface 80, part of the second end face portion 16Ba of the top shield 16B is spaced from the end face 15a of the main pole 15 by a predetermined distance created by the thickness of the second gap layer 19. The thickness of the second gap layer 19 preferably falls within the range of 5 to 60 nm, and may be 30 to 60 nm, for example. The end face 15a of the main pole 15 has a side in contact with the second gap layer 19. This side of the end face 15a defines the track width.

The second return path section 40 includes coupling sections 41 and 42. The coupling section 41 lies on a third portion of the top surface 15T of the main pole 15, the third portion being located away from the medium facing surface 80. The third portion of the top surface 15T of the main pole 15 is located farther from the medium facing surface 80 than are the first and second portions of the top surface 15T of the main pole 15.

As shown in FIG. 5, the second coil portion 20 is wound around the coupling section 41. The write head unit 9 further includes: a first insulating film 61 formed of an insulating material and separating at least part of the second coil portion 20 from the second gap layer 19, the coupling section 41, the second nonmagnetic layer 59 and the third nonmagnetic layer 60; and a second insulating film 62 formed of an insulating material and disposed to cover at least part of the second coil portion 20 and the first insulating film 61. The first and second insulating films 61 and 62 are formed of alumina, for example.

The coupling section 42 lies on the top shield 16B, the coupling section 41 and the second insulating film 62. The coupling section 42 has an end face located in the medium facing surface 80.

The magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, the write head unit 9, and the middle shield 75. The read head unit 8, the middle shield 75 and the write head unit 9 are arranged in this order above the top surface 1a of the substrate 1, the read head unit 8 being closest to the top surface 1a.

The write head unit 9 includes the coil including the first and second coil portions 10 and 20, the main pole 15, the write shield 16, the gap section 17, and the first and second return path sections 30 and 40. The coil, the main pole 15, the write shield 16, the gap section 17, and the first and second return path sections 30 and 40 are disposed above the top surface 1a of the substrate 1. The write shield 16 includes the bottom shield 16A, the top shield 16B, and the two side shields 16C and 16D. The gap section 17 is composed of part of the first gap layer 18 and part of the second gap layer 19. Since the first and second gap layers 18 and 19 are both formed of nonmagnetic material, the gap section 17 is formed of nonmagnetic material.

The first return path section 30 includes the yoke 31 and the coupling sections 32 to 34. The first return path section 30 is located closer to the top surface 1a of the substrate 1 than is the main pole 15, and connects the write shield 16 to part of the main pole 15 located away from the medium facing surface 80 so that a first space 51 is defined by the main pole 15, the gap section 17 (the gap layer 18), the write shield 16 and the first return path section 30 (the yoke 31 and the coupling sections 32 to 34). The coupling section 32 magnetically couples the bottom shield 16A of the write shield 16 to the yoke 31. The coupling sections 33 and 34 magnetically couple the main pole 15 to the yoke 31. The first coil portion 10 passes through the first space S1.

The second return path section 40 includes the coupling sections 41 and 42. The second return path section 40 is located farther the top surface 1a of the substrate 1 than is the main pole 15, and connects the write shield 16 to part of the main pole 15 located away from the medium facing surface 80 so that a second space S2 is defined by the main pole 15, the gap section 17 (the gap layer 19), the write shield 16 and the second return path section 40 (the coupling sections 41 and 42). The coupling sections 41 and 42 magnetically couple the top shield 16B of the write shield 16 to the main pole 15. The second coil portion 20 passes through the second space S2.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 further has the function of capturing a magnetic flux that is produced from the end face 15a of the main pole 15 and spreads in directions other than the direction perpendicular to the plane of the recording medium 90, and thereby preventing the magnetic flux from reaching the recording medium 90. Furthermore, the write shield 16 and the first and second return path sections 30 and 40 have the function of allowing a magnetic flux that has been produced from the end face 15a of the main pole 15 and has magnetized a portion of the recording medium 90 to flow back.

The read head unit 8 is located closer to the top surface 1a of the substrate 1 than is the first return path section 30. The read head unit 8 includes the first read shield layer 3, the MR element 5 and the second read shield layer 7 arranged in this order, the first read shield layer 3 being closest to the top surface 1a of the substrate 1. At least part of the middle shield 75 is located between the second read shield layer 7 and the first return path section 30.

The magnetic head according to the present embodiment further includes the contact sensor 72. The contact sensor 72 is provided for detecting contact of part of the medium facing surface 80 with the recording medium 90. For example, the contact sensor 72 is a resistor that varies in resistance with a change in its own temperature upon contact of part of the medium facing surface 80 with the recording medium 90. The resistor extends in the track width direction TW. The magnetic head according to the present embodiment includes a pair of leads (not illustrated) that are connected to opposite ends of the resistor. The resistor is formed of a metal material or a semiconductor material that varies in resistance at a relatively high rate with respect to a change in temperature, i.e., that has a relatively high temperature coefficient of resistance. Specifically, the resistor may be formed of NiFe, W, Cu, Ni or Pt, for example.

Upon contact of part of the medium facing surface 80 with the recording medium 90, the frictional heat resulting from the contact raises the temperature of the medium facing surface 80 at and in the vicinity of the part in contact with the recording medium 90. Such a rise in temperature also raises the temperature of the contact sensor 72 (resistor) itself. As a result, the contact sensor 72 varies in resistance. Thus, a contact of part of the medium facing surface 80 with the recording medium 90 is detectable by measuring the resistance of the contact sensor 72 through the pair of leads.

The contact sensor 72 is located between the second read shield layer 7 and the middle shield 75. This enables increasing the heat dissipation performance of the contact sensor 72 to improve the efficiency of detection by the contact sensor 72. Reference is now made to FIGS. 4 and 5 to describe the configuration of the first and second coil portions 10 and 20. As shown in FIG. 4, the first coil portion 10 is wound approximately once around the coupling section 33. The first coil portion 10 includes at least one first coil element extending to pass through the first space S1. A coil element refers to a portion of the winding of a coil. In the present embodiment, the first coil portion 10 includes one first coil element 11 extending to pass through the first space S1, particularly through between the coupling section 32 and the coupling section 33. Since the first coil potion 10 is a portion of the coil, the coil can be said to include the first coil element 11. The first coil element 11 is a portion of the winding of the coil. The first coil portion 10 has a coil connection 10E electrically connected to the second coil portion 20.

As shown in FIG. 5, the second coil portion 20 is wound approximately once around the coupling section 41. The second coil portion 20 includes at least one second coil element extending to pass through the second space S2. In the present embodiment, the second coil portion 20 includes one second coil element 21 extending to pass through the second space S2, particularly through between the coupling section 41 and the coupling section 42. Since the second coil potion 20 is a portion of the coil, the coil can be said to include the second coil element 21. The second coil element 21 is a portion of the winding of the coil.

The second coil portion 20 has a coil connection 20S electrically connected to the coil connection 10E of the first coil portion 10. The coil connection 20S is electrically connected to the coil connection 10E via first and second connection layers of columnar shape (not illustrated) that penetrate a plurality of layers interposed between the first coil portion 10 and the second coil portion 20. The first connection layer and the second connection layer are stacked in this order on the coil connection 10E. The coil connection 20S lies on the second connection layer. The first and second connection layers are each formed of a conductive material such as copper. In the example shown in FIGS. 4 and 5, the first coil portion 10 and the second coil portion 20 are connected in series.

Figure 1:
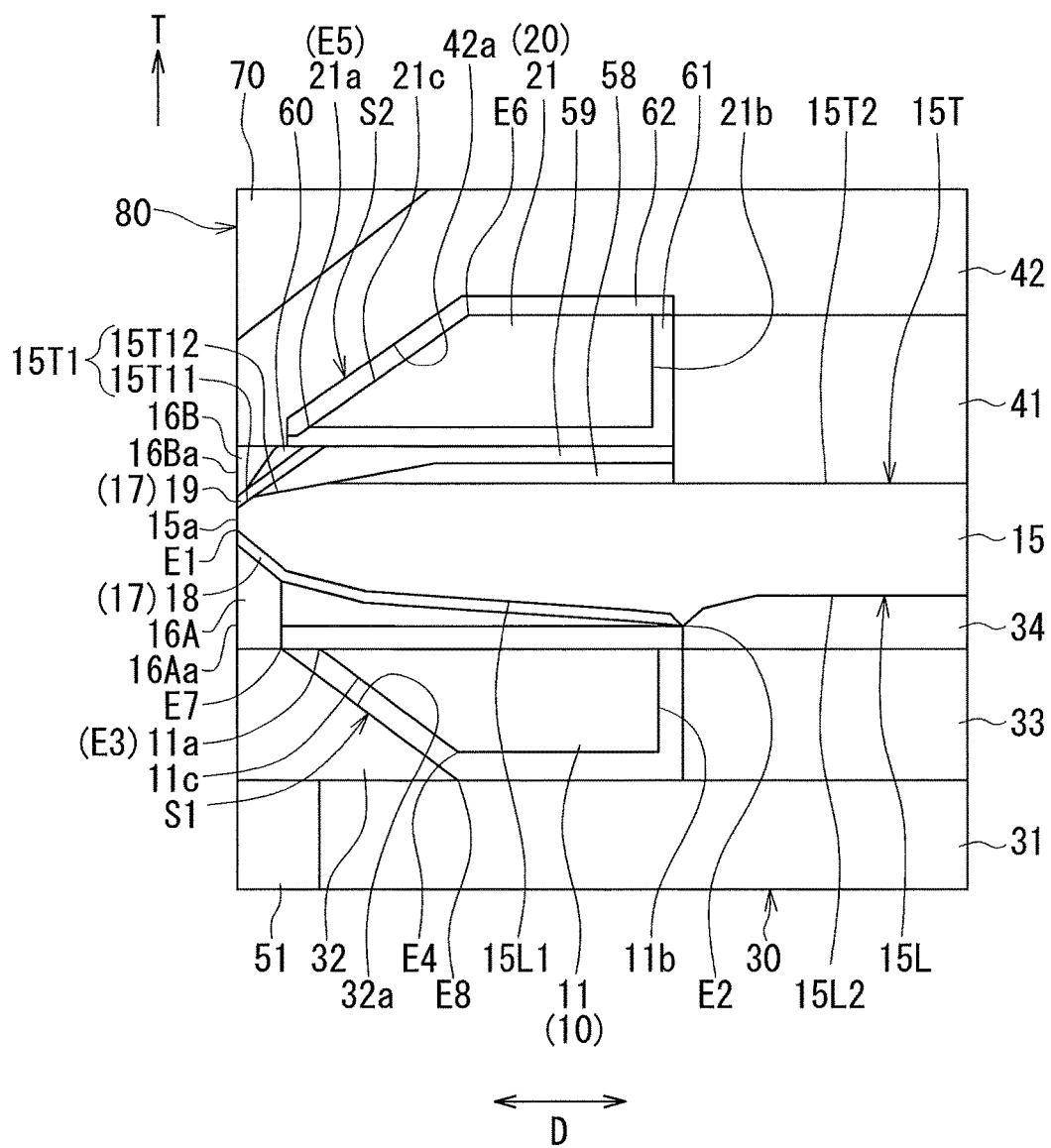
FIG. 1 is a cross-sectional view showing the main part of a magnetic head according to a first embodiment of the invention.

The configuration of the magnetic head according to the present embodiment will now be described in more detail. First, the shape of the main pole 15 will be described in detail with reference to FIG. 1 to FIG. 5. FIG. 1 is a cross-sectional view showing the main part of the magnetic head according to the present embodiment. FIG. 1 shows the main cross section. As shown in FIGS. 4 and 5, the main pole 15 includes a track width defining portion 15A and a wide portion 15B. The track width defining portion 15A has the end face 15a and an end opposite to the end face 15a. The wide portion 15B is connected to the end of the track width defining portion 15A. The main pole 15 has the bottom end 15L, the top surface 15T, the first side part and the second side part. The width of the top surface 15T in the track width direction TW is greater in the wide portion 15B than in the track width defining portion 15A.

In the track width defining portion 15A, the width of the top surface 15T in the track width direction TW is generally constant regardless of distance from the medium facing surface 80. In the wide portion 15B, the width of the top surface 15T in the track width direction TW is, for example, equal to that in the track width defining portion 15A at the boundary between the track width defining portion 15A and the wide portion 15B, and gradually increases with increasing distance from the medium facing surface 80, then becoming constant. The length of the track width defining portion 15A in the direction perpendicular to the medium facing surface 80 will be referred to as neck height. The neck height falls within the range of 0 to 0.3 µm, for example. A zero neck height means that the track width defining portion 15A is not present and the wide portion 15B thus has the end face 15a.

As shown in FIG. 1, the bottom end 15L includes a first portion 15L1 and a second portion 15L2 arranged in this order, the second portion 15L2 being farther from the medium facing surface 80 than is the first portion 15L1. The first portion 15L1 has a first end E1 located in the medium facing surface 80 and a second end E2 located at the boundary between the first portion 15L1 and the second portion 15L2. The first portion 15L1 may be an edge formed by two intersecting planes, or may be a plane connecting two planes to each other. The second portion 15L2 is a plane connected to the second end E2 of the first portion 15L1.

The first portion 15L1 is inclined with respect to the medium facing surface 80 and the direction perpendicular to the medium facing surface 80 such that the second end E2 is located closer to the top surface 1a of the substrate 1 than is the first end E1, i.e., such that the second end E2 is located at a position below that of the first end E1. In FIG. 1, the arrow D indicates the direction perpendicular to the medium facing surface 80.

As shown in FIG. 2, the distance from the top surface 1a of the substrate 1 to any point in the second portion 15L2 is greater than or equal to the distance from the top surface 1a of the substrate 1 to the second end E2.

As shown in FIG. 1, the top surface 15T includes a third portion 15T1 and a fourth portion 15T2 arranged in this order, the fourth portion 15T2 being farther from the medium facing surface 80 than is the third portion 15T1. The third portion 15T1 has a first end located in the medium facing surface 80 and a second end opposite to the first end. In the present embodiment, in particular, the third portion 15T1 includes a front portion 15T11 which includes the first end, and a rear portion 15T12 which includes the second end and is located farther from the medium facing surface 80 than is the front portion 15T11. The fourth portion 15T2 is connected to the second end of the third portion 15T1. The third portion 15T1 is inclined with respect to the medium facing surface 80 and the direction D perpendicular to the medium facing surface 80 such that the second end is located farther from the top surface 1a of the substrate 1 than is the first end, i.e., such that the second end is located at a position above that of the first end. The fourth portion 15T2 extends substantially in the direction D perpendicular to the medium facing surface 80.

As shown in FIG. 3, the end face 15a of the main pole 15 has a first side in contact with the second gap layer 19, a second side connected to one end of the first side, and a third side connected to the other end of the first side. The first side defines the track width. The position of an end of a record bit to be recorded on the recording medium 90 is determined by the position of the first side. The width of the end face 15a of the main pole 15 in the track width direction TW decreases with increasing distance from the first side, that is, with decreasing distance to the top surface 1a of the substrate 1. Each of the second side and the third side forms an angle in the range of, for example, 7° to 17°, and preferably in the range of 10° to 15°, with respect to the direction perpendicular to the top surface 1a of the substrate 1. The first side has a length in the range of 0.05 to 0.20 µm, for example.

The first and second coil portions 10 and 20 and the first and second coil elements 11 and 21 will now be described in detail with reference to FIG. 1. The first coil portion 10 includes at least one first coil element. The at least one first coil element includes one specific first coil element. In the present embodiment, the first coil portion 10 includes one first coil element 11, and the first coil element 11 is the specific first coil element. The specific first coil element 11 has a first front end 11a closest to the medium facing surface 80, a first rear end 11b farthest from the medium facing surface 80, and a first inclined surface 11c contiguous with the first front end 11a. The first inclined surface 11c has a third end E3 closest to the medium facing surface 80 and a fourth end E4 farthest from the medium facing surface 80. The first inclined surface 11c is inclined with respect to the medium facing surface 80 and the direction D perpendicular to the medium facing surface 80 such that the fourth end E4 is located closer to the top surface 1a of the substrate 1 than is the third end E3, i.e., such that the fourth end E4 is located at a position below that of the third end E3.

The distance from the medium facing surface 80 to the first rear end 11b of the specific first coil element 11 is smaller than or equal to the distance from the medium facing surface 80 to the second end E2 of the first portion 15L1 of the bottom end 15L of the main pole 15. FIG. 1 shows an example in which the distance from the medium facing surface 80 to the first rear end 11b is smaller than the distance from the medium facing surface 80 to the second end E2. The distance from the medium facing surface 80 to the second end E2 falls within the range of 0.7 to 2.0 µm, for example. In the example shown in FIG. 1, the distance from the medium facing surface 80 to the end of the coupling section 33 closest to the medium facing surface 80 and the distance from the medium facing surface 80 to the end of the coupling section 34 closest to the medium facing surface 80 are each equal to the distance from the medium facing surface 80 to the second end E2.

The second coil portion 20 includes at least one second coil element. The at least one second coil element includes one specific second coil element. In the present embodiment, the second coil portion 20 includes one second coil element 21, and the second coil element 21 is the specific second coil element. As shown in FIG. 1, the specific second coil element 21 has a second front end 21a closest to the medium facing surface 80, a second rear end 21b farthest from the medium facing surface 80, and a second inclined surface 21c which is contiguous with the second front end 21a and is located farther from the top surface 1a of the substrate 1 than is the second front end 21a. The second inclined surface 21c has a fifth end E5 closest to the medium facing surface 80 and a sixth end E6 farthest from the medium facing surface 80. The second inclined surface 21c is inclined with respect to the medium facing surface 80 and the direction D perpendicular to the medium facing surface 80 such that the sixth end E6 is located farther from the top surface 1a of the substrate 1 than is the fifth end E5, i.e., such that the sixth end E6 is located at a position above that of the fifth end E5.

The first return path section 30 and the second return path section 40 will now be described in detail with reference to FIG. 1. The first return path section 30 includes the yoke 31 and the coupling section 32. The yoke 31 is located closer to the top surface 1a of the substrate 1 than is the at least one first coil element of the first coil portion 10. The coupling section 32 has a third inclined surface 32a facing toward the first portion 15L1 of the bottom end 15L of the main pole 15. The third inclined surface 32a has a seventh end E7 closest to the medium facing surface 80 and an eighth end E8 farthest from the medium facing surface 80. The third inclined surface 32a is inclined with respect to the medium facing surface 80 and the direction D perpendicular to the medium facing surface 80 such that the eighth end E8 is located closer to the top surface 1a of the substrate 1 than is the seventh end E7, i.e., such that the eighth end E8 is located at a position below that of the seventh end E7. In the present embodiment, the first inclined surface 11c of the specific first coil element 11 is opposed to the third inclined surface 32a.

The second return path section 40 includes the coupling sections 41 and 42. The coupling section 42 has a fourth inclined surface 42a opposed to the second inclined surface 21c of the specific second coil element 21.

Now, functions and effects specific to the magnetic head according to the present embodiment will be described. In the magnetic head according to the present embodiment, the end face of the write shield 16 includes the first to fourth end face portions 16Aa, 16Ba, 16Ca and 16Da. By virtue of this, the present embodiment makes it possible that in a region that is located closer to the top surface 1a of the substrate 1 than is the end face 15a of the main pole 15, a region that is located farther from the top surface 1a of the substrate 1 than is the end face 15a of the main pole 15, and regions located on opposite sides of the end face 15a of the main pole 15 in the track width direction TW, a magnetic flux produced from the end face 15a of the main pole 15 and spreading in directions other than the direction perpendicular to the surface of the recording medium 90 is captured and thereby prevented from reaching the recording medium 90. As a result, the present embodiment enables reduction or elimination of the occurrence of unwanted erasure induced by a skew.

In the present embodiment, the bottom end 15L of the main pole 15 includes the first portion 15L1, and the top surface 15T of the main pole 15 includes the third portion 15T1. By virtue of this, the present embodiment allows the thickness of the main pole 15 near the medium facing surface 80 to decrease with decreasing distance to the medium facing surface 80. This enables reduction or elimination of the occurrence of unwanted erasure induced by a skew.

In the present embodiment, the distance from the medium facing surface 80 to the first rear end 11b of the specific first coil element 11 is smaller than or equal to the distance from the medium facing surface 80 to the second end E2 of the first portion 15L1. Thus, in the present embodiment the specific first coil element 11 is present between the first portion 15L1 and the first return path section 30. As a result, the present embodiment enables reduction or elimination of leakage of magnetic flux from the main pole 15 to the first return path section 30.

In the present embodiment, the specific first coil element 11 has the first inclined surface 11c. The coupling section 32 constituting part of the first return path section 30 has the third inclined surface 32a facing toward the first portion 15L1. The first inclined surface 11c is opposed to the third inclined surface 32a. By virtue of such a configuration, the present embodiment allows the end of the first coil portion 10 closest to the medium facing surface 80, i.e., the first front end 11a of the specific first coil element 11, to be brought closer to the medium facing surface 80. This allows also the entirety of the specific first coil element 11 to be brought closer to the medium facing surface 80, and as a result, allows also the respective ends of the coupling sections 33 and 34 closest to the medium facing surface 80 to be brought closer to the medium facing surface 80.

Further, the present embodiment enables formation of a short magnetic path along the third inclined surface 32a between the bottom shield 16A and the yoke 31 by the coupling section 32.

In the present embodiment, providing the specific first coil element 11 with the first inclined surface 11c allows a reduction in dimension of the specific first coil element 11 in the direction perpendicular to the top surface 1a of the substrate 1 while allowing the specific first coil element 11 to have a sufficient volume. This allows the yoke 31 to be brought closer to the main pole 15.

By virtue of the foregoing, the present embodiment enables reduction in length of the magnetic path passing through the write shield 16, the first return path section 30 and the main pole 15.

In the present embodiment, the specific second coil element 21 has the second inclined surface 21c. The coupling section 42 constituting part of the second return path section 40 has the fourth inclined surface 42a opposed to the second inclined surface 21c. The present embodiment allows the end of the second coil portion 20 closest to the medium facing surface 80, i.e., the second front end 21a of the specific second coil element 21, to be brought closer to the medium facing surface 80. This allows also the entirety of the specific second coil element 21 to be brought closer to the medium facing surface 80, and as a result, allows also the end of the coupling section 41 closest to the medium facing surface 80 to be brought closer to the medium facing surface 80. Further, the present embodiment enables formation of a short magnetic path along the fourth inclined surface 42a by the coupling section 42. By virtue of the foregoing, the present embodiment enables reduction in length of the magnetic path passing through the write shield 16, the second return path section 40 and the main pole 15.

As mentioned above, the present embodiment allows the yoke 31 to be brought closer to the main pole 15. This enables provision of the middle shield 75 without necessitating a large distance between the read head unit 8 and the write head unit 9.

A manufacturing method for the magnetic head according to the present embodiment will now be described. As shown in FIG. 2 and FIG. 3, the manufacturing method for the magnetic head according to the present embodiment starts with forming the insulating layer 2, the first read shield layer 3 and the first read shield gap film 4 in this order into a stack on the substrate 1. Then, the MR element 5 and leads (not illustrated) connected to the MR element 5 are formed on the first read shield gap film 4. The MR element 5 and the leads are then covered with the second read shield gap film 6. Next, the second read shield layer 7 and the nonmagnetic layer 71 are formed in this order into a stack on the second read shield gap film 6.

Next, the contact sensor 72 and the non-illustrated pair of leads connected to the contact sensor 72 are formed on the nonmagnetic layer 71. The contact sensor 72 and the pair of leads are then covered with the nonmagnetic layer 73. The nonmagnetic layers 71 and 73 are then selectively etched, so that an opening for exposing the top surface of the second read shield layer 7 is formed through the nonmagnetic layers 71 and 73. Then, the magnetic layer 74 is formed at the location of the opening. Then, the middle shield 75 and the nonmagnetic layer 76 are formed in this order into a stack over the nonmagnetic layer 73 and the magnetic layer 74.

Next, the yoke 31 is formed on the nonmagnetic layer 76 by frame plating, for example. Then, the insulating layer 51 is formed over the entire top surface of the stack. The insulating layer 51 is then polished by, for example, chemical mechanical polishing (hereinafter referred to as CMP), until the yoke 31 is exposed.

Reference is now made to FIGS. 6 to 18 to describe a series of steps to follow the foregoing step. FIGS. 6 to 18 each illustrate a stack of layers formed in the process of manufacturing the magnetic head. FIGS. 6 to 18 show a cross section perpendicular to the medium facing surface 80 and to the top surface 1a of the substrate 1, particularly the main cross section. FIGS. 6 to 18 omit the illustration of portions located below the yoke 31 and the insulating layer 51. In FIGS. 6 to 18, the symbol "ABS" indicates the position at which the medium facing surface 80 is to be formed.

Figure 6:
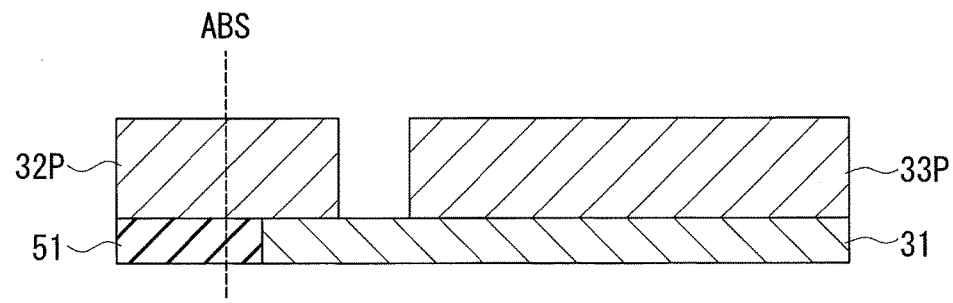
FIG. 6 is a cross-sectional view showing a step of a manufacturing method for the magnetic head according to the first embodiment of the invention.

In the step shown in FIG. 6, an initial coupling section 32P is formed on the yoke 31 and the insulating layer 51, and an initial coupling section 33P is formed on the yoke 31, by performing frame plating, for example.

Figure 7:
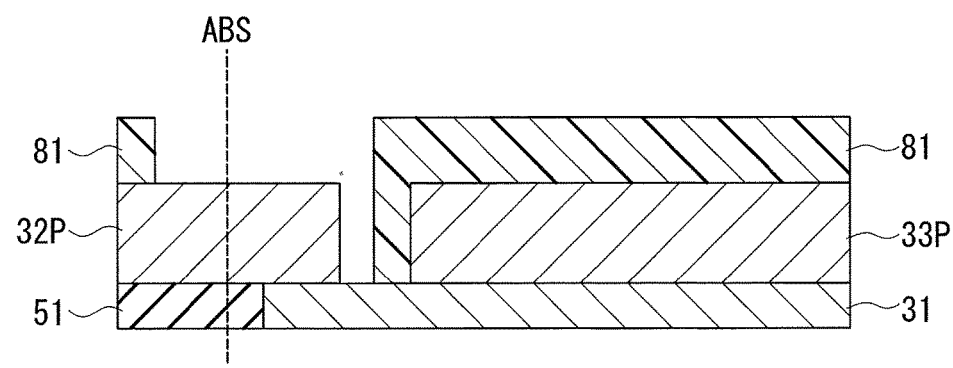
FIG. 7 is a cross-sectional view showing a step that follows the step shown in FIG. 6.

FIG. 7 shows the next step. In this step, a photoresist mask 81 is formed to cover part of the initial coupling section 32P and the whole of the initial coupling section 33P. The photoresist mask 81 is formed by patterning a photoresist layer. Other photoresist masks to be used in later steps will be formed in the same manner as the photoresist mask 81. The photoresist mask 81 does not cover an area of the initial coupling section 32P where the third inclined surface 32a of the coupling section 32 is to be formed.

Figure 8:
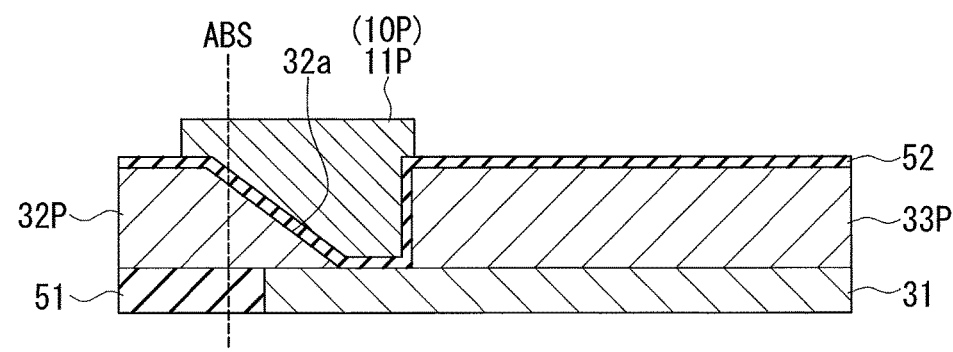
FIG. 8 is a cross-sectional view showing a step that follows the step shown in FIG. 7.

FIG. 8 shows the next step. In this step, first, part of the initial coupling section 32P is taper-etched by, for example, ion beam etching (hereinafter referred to as IBE) using the photoresist mask 81 as an etching mask to thereby provide the initial coupling section 32P with the third inclined surface 32a. The photoresist mask 81 is then removed. Next, the insulating film 52 is formed over the entire top surface of the stack by atomic layer deposition, for example. Then, a first initial coil portion 10P is formed on the insulating film 52 by frame plating, for example. The first initial coil portion 10P is formed such that a portion thereof rides over the initial coupling sections 32P and 33P. The first initial coil portion 10P includes a first initial coil element 11P which later becomes the specific first coil element 11.

Figure 9:
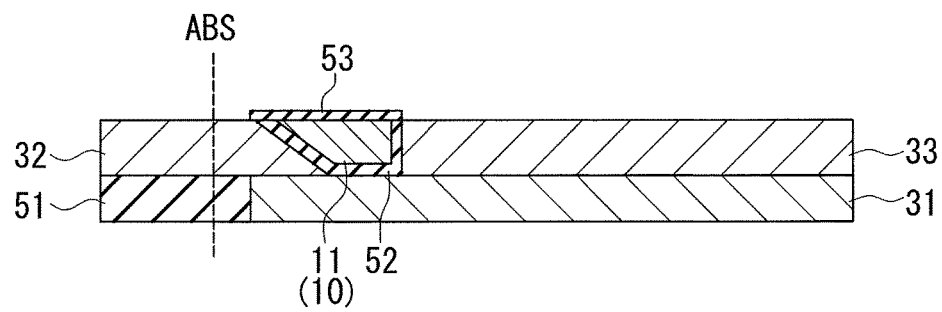
FIG. 9 is a cross-sectional view showing a step that follows the step shown in FIG. 8.

FIG. 9 shows the next step. In this step, first, an insulating layer (not illustrated) is formed over the entire top surface of the stack. Then, the first initial coil portion 10P, the initial coupling sections 32P and 33P, the insulating film 52 and the non-illustrated insulating layer are polished by CMP, for example. This makes the first initial coil element 11P into the specific first coil element 11, makes the first initial coil portion 10P into the first coil portion 10, makes the initial coupling section 32P into the coupling section 32, and makes the initial coupling section 33P into the coupling section 33. Next, the insulating layer 53 is formed over the entire top surface of the stack. The insulating layer 53 is then selectively etched to form therein a first opening for exposing the top surface of the coupling section 32, a second opening for exposing the top surface of the coupling section 33, and a third opening for exposing the coil connection 10E (see FIG. 4) of the first coil portion 10.

Figure 10:
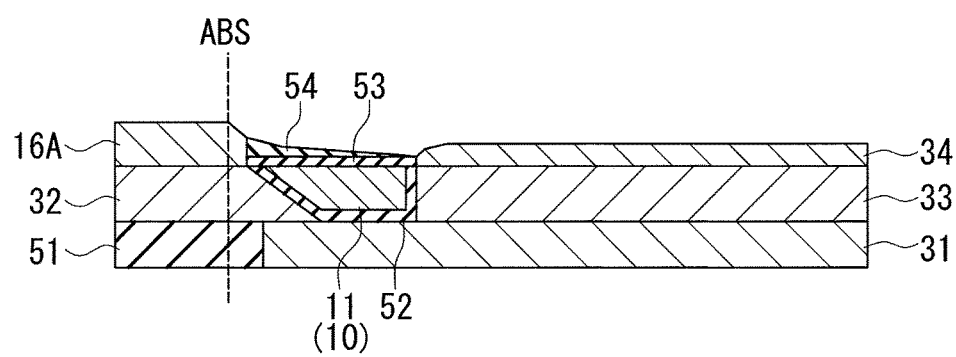
FIG. 10 is a cross-sectional view showing a step that follows the step shown in FIG. 9.

FIG. 10 shows the next step. In this step, first, an initial bottom shield is formed on the coupling section 32 at the location of the first opening, the coupling section 34 is formed on the coupling section 33 at the location of the second opening, and the first connection layer (not illustrated) is formed on the coil connection 10E at the location of the third opening, by performing frame plating, for example. Next, the nonmagnetic layer 54 is formed over the entire top surface of the stack. The nonmagnetic layer 54 is then polished by, for example, CMP, until the initial bottom shield, the coupling section 34 and the first connection layer are exposed.

Next, the initial bottom shield and the nonmagnetic layer 54 are taper-etched in part by, for example, IBE to thereby provide the top surface of the initial bottom shield with a portion to be opposed to the first portion 15L1 (see FIG. 1) of the bottom end 15L of the main pole 15 to be formed later. This makes the initial bottom shield into the bottom shield 16A. This etching process also etches the coupling section 34 and the first connection layer in part.

Figure 11:
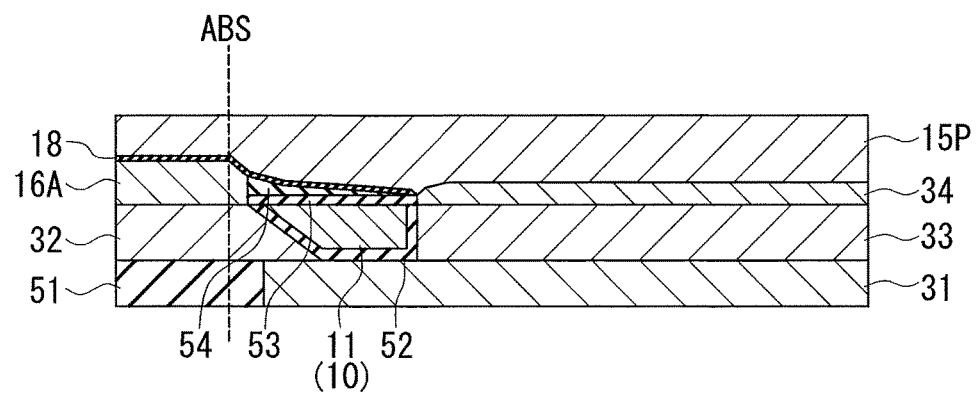
FIG. 11 is a cross-sectional view showing a step that follows the step shown in FIG. 10.

FIG. 11 shows the next step. In this step, first, the side shields 16C and 16D (see FIG. 3) are formed on the bottom shield 16A by frame plating, for example. The first gap layer 18 is then formed to cover the bottom shield 16A and the side shields 16C and 16D. Where alumina is selected as the material of the first gap layer 18, the first gap layer 18 is formed by atomic layer deposition, for example. Where Ru is selected as the material of the first gap layer 18, the first gap layer 18 is formed by chemical vapor deposition, for example. Next, the first gap layer 18 is selectively etched to form therein an opening for exposing the top surface of the coupling section 34 and an opening for exposing the top surface of the first connection layer. Next, an initial main pole 15P and the second connection layer (not illustrated) are formed by frame plating, for example. The initial main pole 15P and the second connection layer are formed such that their top surfaces are higher in level than portions of the first gap layer 18 lying on the side shields 16C and 16D.

Figure 12:
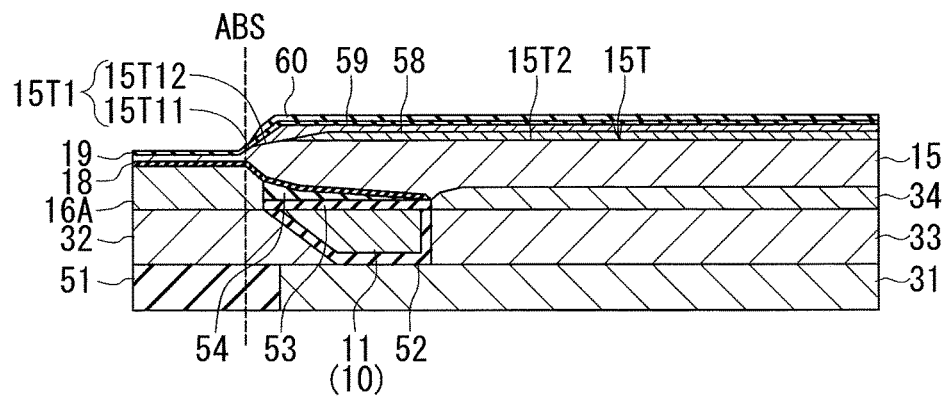
FIG. 12 is a cross-sectional view showing a step that follows the step shown in FIG. 11.

FIG. 12 shows the next step. In this step, first, a nonmagnetic layer (not illustrated) is formed over the entire top surface of the stack. Then, the initial main pole 15P, the second connection layer, the first gap layer 18 and the non-illustrated nonmagnetic layer are polished by, for example, CMP, until the side shields 16C and 16D are exposed. The first nonmagnetic layer 58 is then formed on the initial main pole 15P. Next, the initial main pole 15P and the first nonmagnetic layer 58 are taper-etched by, for example, IBE to thereby provide the initial main pole 15P with the rear portion 15T12 of the third portion 15T1 of the top surface 15T of the main pole 15. Next, the second nonmagnetic layer 59 is formed on the initial main pole 15P and the first nonmagnetic layer 58. The initial main pole 15P and the second nonmagnetic layer 59 are then taper-etched by, for example, IBE to thereby provide the initial main pole 15P with the front portion 15T11 of the third portion 15T1 of the top surface 15T of the main pole 15. This makes the initial main pole 15P into the main pole 15.

Next, the second gap layer 19 is formed over the entire top surface of the stack by sputtering or chemical vapor deposition, for example. The third nonmagnetic layer 60 is then formed on the second gap layer 19. The third nonmagnetic layer 60 may be formed by a lift-off process, or by initially forming a nonmagnetic film on the second gap layer 19 and then etching a portion of the nonmagnetic film.

Figure 13:
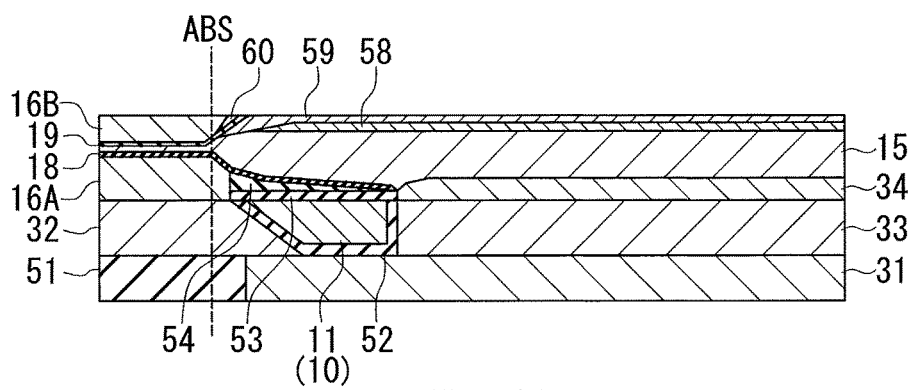
FIG. 13 is a cross-sectional view showing a step that follows the step shown in FIG. 12.

FIG. 13 shows the next step. In this step, first, the second gap layer 19 is selectively etched by, for example, IBE so that the top surfaces of the side shields 16C and 16D are exposed in part. Then, an initial top shield is formed over the side shields 16C and 16D, the second gap layer 19 and the third nonmagnetic layer 60 by frame plating, for example. The initial top shield, the second gap layer 19 and the third nonmagnetic layer 60 are then polished by, for example, CMP, until the second nonmagnetic layer 59 is exposed. This makes the initial top shield into the top shield 16B.

Figure 14:
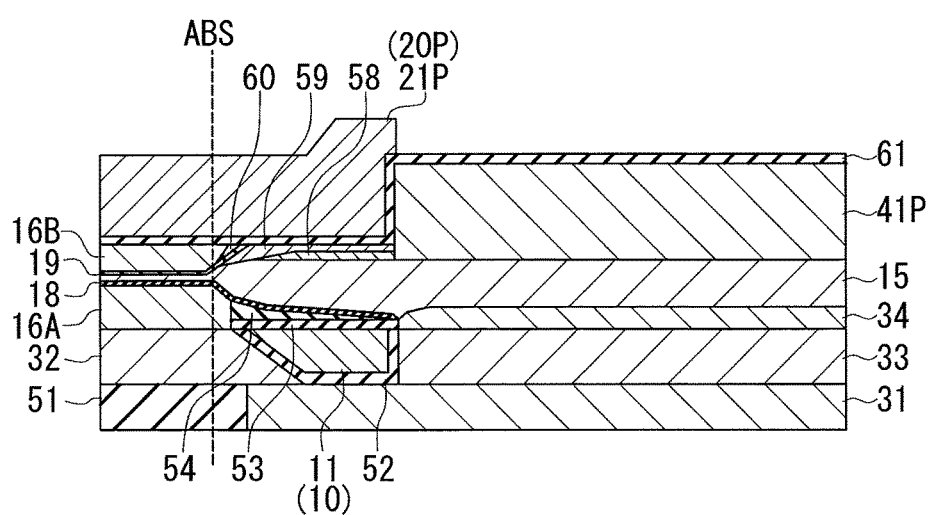
FIG. 14 is a cross-sectional view showing a step that follows the step shown in FIG. 13.

FIG. 14 shows the next step. In this step, first, the first and second nonmagnetic layers 58 and 59 are selectively etched by, for example, IBE so that the third portion of the top surface 15T of the main pole 15 is exposed. Next, an initial coupling section 41P is formed on the main pole 15 by frame plating, for example. Then, the first insulating film 61 is formed over the entire top surface of the stack by atomic layer deposition, for example. The first insulating film 61 is then selectively etched to form therein an opening for exposing the top surface of the second connection layer. Next, a second initial coil portion 20P is formed by frame plating, for example. The second initial coil portion 20P is formed such that a portion thereof rides over the initial coupling section 41P. The second initial coil portion 20P includes a second initial coil element 21P which later becomes the specific second coil element 21.

Figure 15:
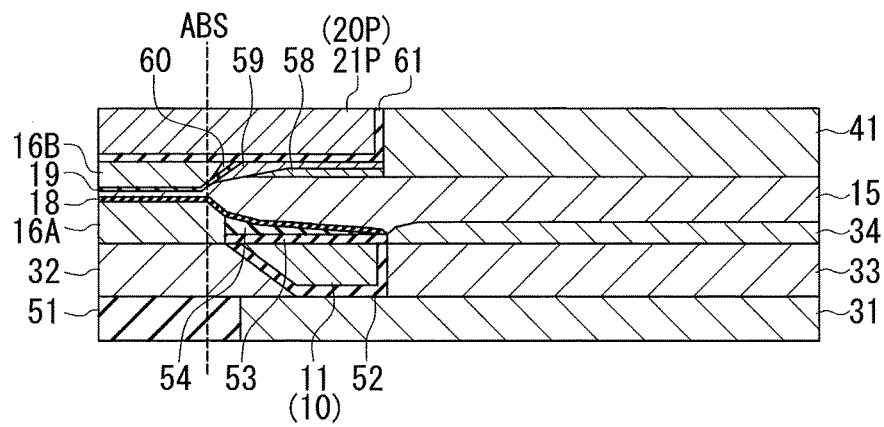
FIG. 15 is a cross-sectional view showing a step that follows the step shown in FIG. 14.

FIG. 15 shows the next step. In this step, first, the second initial coil portion 20P, the initial coupling section 41P and the first insulating film 61 are polished by CMP, for example. This makes the initial coupling section 41P into the coupling section 41.

Figure 16:
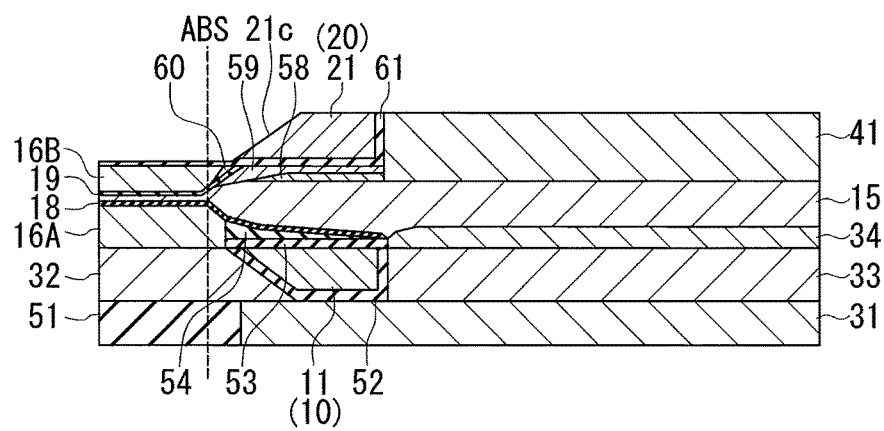
FIG. 16 is a cross-sectional view showing a step that follows the step shown in FIG. 15.

FIG. 16 shows the next step. In this step, a first photoresist mask (not illustrated) is initially formed to cover a portion of the second initial coil portion 20P. The first photoresist mask does not cover an area of the second initial coil portion 20P where the second inclined surface 21c of the specific second coil element 21 is to be formed. Next, the second initial coil portion 20P is taper-etched in part by, for example, IBE, using the first photoresist mask as an etching mask. This etching provides the second initial coil element 21P with the second inclined surface 21c of the specific second coil element 21. This makes the second initial coil element 21P into the specific second coil element 21, thereby making the second initial coil portion 20P into the second coil portion 20. In this etching process, the first insulating film 61 serves as an etching stopper to stop the etching. The first photoresist mask is then removed.

Figure 17:
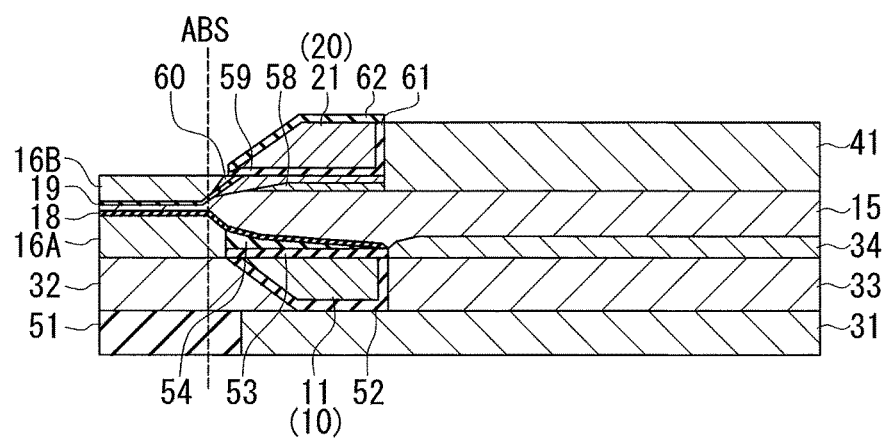
FIG. 17 is a cross-sectional view showing a step that follows the step shown in FIG. 16.

FIG. 17 shows the next step. In this step, first, the second insulating film 62 is formed over the entire top surface of the stack by atomic layer deposition, for example. Next, a second photoresist mask (not illustrated) is formed on the top surface of the stack. The second photoresist mask covers neither of a portion of the top surface of the stack located above the top surface of the top shield 15B and a portion of the top surface of the stack located above the top surface of the coupling section 41. Next, the first and second insulating films 61 and 62 are etched by, for example, reactive ion etching or IBE, using the second photoresist mask as an etching mask. This removes portions of the first and second insulating films 61 and 62 located above the top surface of the top shield 16B, and a portion of the second insulating film 62 located above the top surface of the coupling section 41. The second photoresist mask is then removed.

Figure 18:
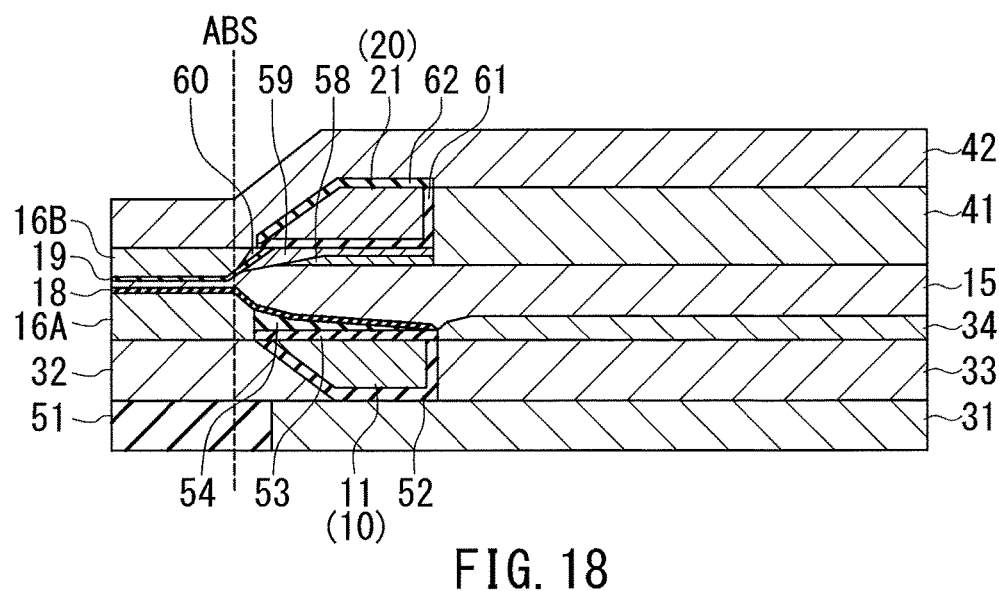
FIG. 18 is a cross-sectional view showing a step that follows the step shown in FIG. 17.

FIG. 18 shows the next step. In this step, first, the coupling section 42 is formed over the top shield 16B, the coupling section 41 and the second insulating film 62 by frame plating, for example. Next, the protective layer 70 is formed to cover the entire top surface of the stack. Then, wiring, terminals and other components are formed on the protective layer 70, and the substrate 1 is cut near the position ABS at which the medium facing surface 80 is to be formed. The cut surface is then polished to form the medium facing surface 80, and processing such as fabrication of flying rails is performed to complete the magnetic head.

Second Embodiment

Figure 19:
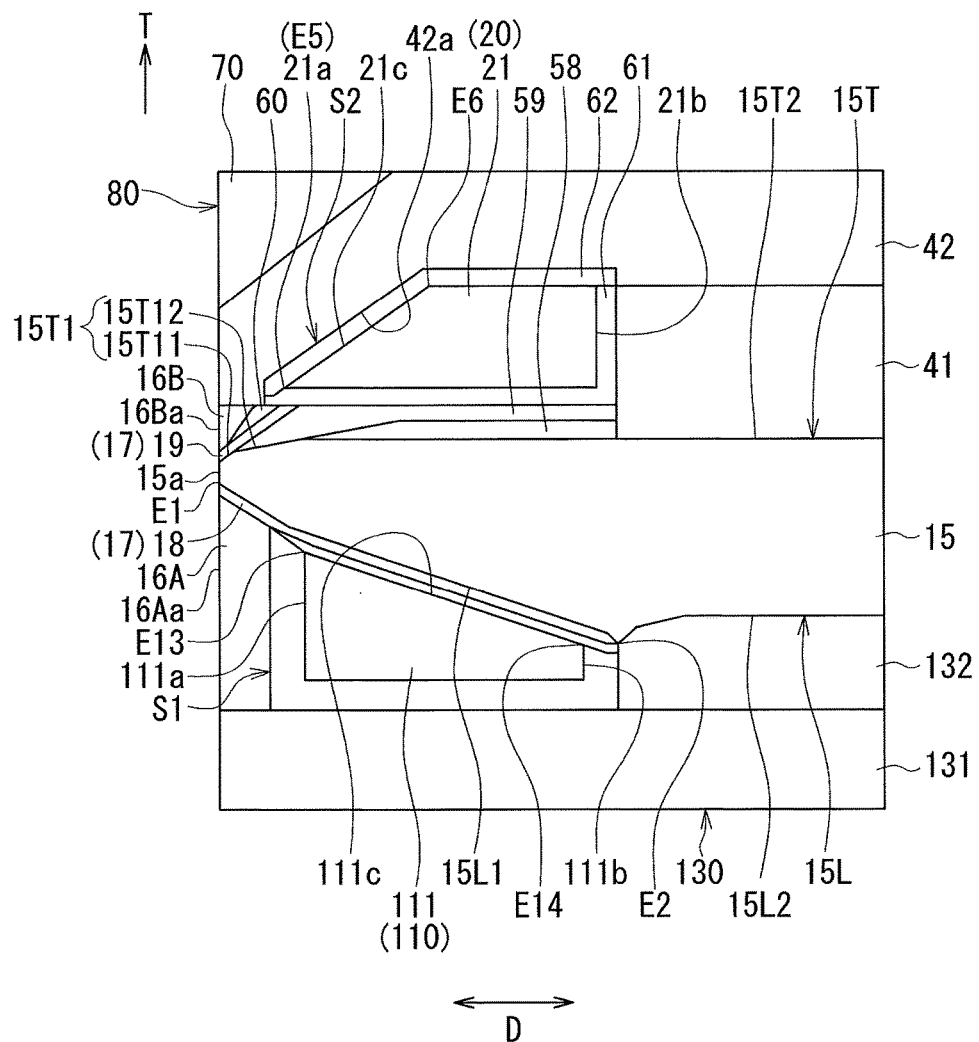
FIG. 19 is a cross-sectional view showing the main part of a magnetic head according to a second embodiment of the invention.

A magnetic head according to a second embodiment of the present invention will now be described with reference to FIG. 19. FIG. 19 is a cross-sectional view showing the main part of the magnetic head according to the present embodiment. FIG. 19 shows a cross section perpendicular to the medium facing surface and to the top surface of the substrate, particularly the main cross section. The arrow T in FIG. 19 indicates the direction of travel of the recording medium.

The magnetic head according to the present embodiment differs from the magnetic head according to the first embodiment in the following ways. In the magnetic head according to the present embodiment, the coil includes a first coil portion 110 in place of the first coil portion 10 of the first embodiment. The first coil portion 110 is formed of a conductive material such as copper. The first coil portion 110 and the second coil portion 20 are connected in the same manner as the first coil portion 10 and the second coil portion 20 of the first embodiment.

Further, the magnetic head according to the present embodiment includes a first return path section 130 in place of the first return path section 30 of the first embodiment. The first return path section 130 can be formed of the same magnetic material as the first return path section 30. Relative locations of the first return path section 130 and the main pole 15 with respect to each other are the same as those of the first return path section 30 and the main pole 15 in the first embodiment, and the first return path section 130 is connected to the main pole 15 and the write shield 16 in the same manner as the manner in which the first return path section 30 is connected to the main pole 15 and the write shield 16 in the first embodiment.

The first return path section 130 includes a yoke 131 and a coupling section 132. The yoke 131 lies on the nonmagnetic layer 76 (see FIGS. 2 and 3). In the present embodiment, the bottom shield 16A of the write shield 16 is located near the medium facing surface 80 and lies on the yoke 131. The coupling section 132 is located farther from the medium facing surface 80 than is the bottom shield 16A and lies on the yoke 131. The yoke 131 has an end face located in the medium facing surface 80. The insulating layer 51 (see FIG. 1 to FIG. 3) is disposed around the yoke 131.

The first coil portion 110 is wound around the coupling section 132. In the present embodiment, the insulating film 52 separates the first coil portion 110 from the bottom shield 16A, the yoke 131 and the coupling section 132.

The insulating layer 53 and the non-illustrated insulating layer described in relation to the first embodiment are omitted from the present embodiment. The nonmagnetic layer 54 lies on the first coil portion 110, the insulating layer 51 and the insulating film 52 and surrounds the bottom shield 16A and the coupling section 132.

Reference is now made to FIG. 19 to describe the configuration of the first coil portion 110. The first coil portion 110 is wound approximately once around the coupling section 132. The first coil portion 110 includes at least one first coil element extending to pass through the first space S1. In the present embodiment, the first coil portion 110 includes one first coil element 111 extending to pass through the first space S1, particularly through between the bottom shield 16A and the coupling section 132. Since the first coil potion 110 is a portion of the coil, the coil can be said to include the first coil element 111. The first coil element 111 is a portion of the winding of the coil. The first coil portion 110 has a coil connection (not illustrated) electrically connected to the second coil portion 20.

The first coil portion 110 includes at least one first coil element, the at least one first coil element including one specific first coil element. In the present embodiment, the first coil portion 110 includes the one first coil element 111, and the first coil element 111 is the specific first coil element. As shown in FIG. 19, the specific first coil element 111 has a first front end 111a closest to the medium facing surface 80, a first rear end 111b farthest from the medium facing surface 80, and a first inclined surface 111c contiguous with the first front end 111a. The first inclined surface 111c has a third end E13 closest to the medium facing surface 80 and a fourth end E14 farthest from the medium facing surface 80. The first inclined surface 111c is inclined with respect to the medium facing surface 80 and the direction D perpendicular to the medium facing surface 80 such that the fourth end E14 is located closer to the top surface 1a (see FIGS. 2 and 3) of the substrate 1 than is the third end E13, i.e., such that the fourth end E14 is located at a position below that of the third end E13.

In the present embodiment, the first inclined surface 111c is opposed to the first portion 15L1 of the bottom end 15L of the main pole 15. The distance from the medium facing surface 80 to the first rear end 111b of the specific first coil element 111 is smaller than or equal to the distance from the medium facing surface 80 to the second end E2 of the first portion 15L1. Thus, in the present embodiment the specific first coil element 111 is present between the first portion 15L1 and the first return path section 130. As a result, the present embodiment enables reduction or elimination of leakage of magnetic flux from the main pole 15 to the first return path section 130. FIG. 19 shows an example in which the distance from the medium facing surface 80 to the first rear end 111b is smaller than the distance from the medium facing surface 80 to the second end E2.

In the present embodiment, the bottom shield 16A lies on the yoke 131. The present embodiment thus allows the yoke 131 to be brought even closer to the main pole 15 when compared with the yoke 31 of the first embodiment.

In the present embodiment, the specific first coil element 111 has the first inclined surface 111c opposed to the first portion 15L1 of the bottom end 15L of the main pole 15. This enables locating the specific first coil element 111 near the first portion 15L1 of the bottom end 15L of the main pole 15 and the medium facing surface 80 while allowing the specific first coil element 111 to have a sufficient volume.

By virtue of the foregoing, the present embodiment enables reduction in length of the magnetic path passing through the write shield 16, the first return path section 130 and the main pole 15.

The remainder of configuration, function and effects of the present embodiment are similar to those of the first embodiment.

The present invention is not limited to the foregoing embodiments, and various modifications may be made thereto. For example, as far as the requirements of the appended claims are met, the main pole 15, the specific first coil element 11 or 111, the specific second coil element 21 and the coupling section 32 can be shaped and located as desired, and need not necessarily be as in the respective examples illustrated in the foregoing embodiments.

Further, the coil of the present invention may be one that is wound helically around the main pole 15.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head for perpendicular magnetic recording, comprising:

a medium facing surface configured to face a recording medium;

a coil for producing a magnetic field corresponding to data to be written on the recording medium;

a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;

a write shield formed of a magnetic material and having an end face located in the medium facing surface;

a gap section formed of a nonmagnetic material and located between the main pole and the write shield;

a first return path section formed of a magnetic material;

a second return path section formed of a magnetic material; and a substrate having a top surface, wherein the coil, the main pole, the write shield, the gap section, the first return path section and the second return path section are located above the top surface of the substrate, the first return path section is located closer to the top surface of the substrate than is the main pole, and connects the write shield to part of the main pole located away from the medium facing surface so that a first space is defined by the main pole, the gap section, the write shield and the first return path section, the second return path section is located farther from the top surface of the substrate than is the main pole, and connects the write shield to part of the main pole located away from the medium facing surface so that a second space is defined by the main pole, the gap section, the write shield and the second return path section, the end face of the write shield includes a first end face portion and a second end face portion, the first end face portion being located closer to the top surface of the substrate than is the end face of the main pole, the second end face portion being located farther from the top surface of the substrate than is the end face of the main pole, the coil includes at least one first coil element extending to pass through the first space, and at least one second coil element extending to pass through the second space, the main pole has a bottom end facing toward the top surface of the substrate, the bottom end of the main pole includes a first portion and a second portion arranged in this order, the second portion being farther from the medium facing surface than is the first portion, the first portion has a first end located in the medium facing surface, and a second end located at a boundary between the first portion and the second portion, the first portion is inclined with respect to the medium facing surface and a direction perpendicular to the medium facing surface such that the second end is located closer to the top surface of the substrate than is the first end, a distance from the top surface of the substrate to any point in the second portion is greater than or equal to a distance from the top surface of the substrate to the second end, the at least one first coil element includes one specific first coil element, the specific first coil element has a first front end closest to the medium facing surface, a first rear end farthest from the medium facing surface, and a first inclined surface contiguous with the first front end, the first inclined surface has a third end closest to the medium facing surface and a fourth end farthest from the medium facing surface, the first inclined surface is inclined with respect to the medium facing surface and the direction perpendicular to the medium facing surface such that the fourth end is located closer to the top surface of the substrate than is the third end, and a distance from the medium facing surface to the first rear end of the specific first coil element is smaller than or equal to a distance from the medium facing surface to the second end of the first portion.

2. The magnetic head for perpendicular magnetic recording according to claim 1, wherein the at least one second coil element includes one specific second coil element, the specific second coil element has a second front end closest to the medium facing surface, a second rear end farthest from the medium facing surface, and a second inclined surface contiguous with the second front end, the second inclined surface being located farther from the top surface of the substrate than is the second front end, the second inclined surface has a fifth end closest to the medium facing surface and a sixth end farthest from the medium facing surface, and the second inclined surface is inclined with respect to the medium facing surface and the direction perpendicular to the medium facing surface such that the sixth end is located farther from the top surface of the substrate than is the fifth end.

3. The magnetic head for perpendicular magnetic recording according to claim 1, wherein the first return path section includes a yoke which is located closer to the top surface of the substrate than is the at least one first coil element, and a coupling section for magnetically coupling the yoke to the write shield, the coupling section has a third inclined surface facing toward the first portion, the third inclined surface has a seventh end closest to the medium facing surface and an eighth end farthest from the medium facing surface, the third inclined surface is inclined with respect to the medium facing surface and the direction perpendicular to the medium facing surface such that the eighth end is located closer to the top surface of the substrate than is the seventh end, and the first inclined surface is opposed to the third inclined surface.

4. The magnetic head for perpendicular magnetic recording according to claim 1, wherein the first inclined surface is opposed to the first portion.

5. The magnetic head for perpendicular magnetic recording according to claim 1, wherein the end face of the write shield further includes a third end face portion and a fourth end face portion, the third end face portion and the fourth end face portion being located on opposite sides of the end face of the main pole in a track width direction.

6. The magnetic head for perpendicular magnetic recording according to claim 1, further comprising a read head unit and a middle shield, the read head unit being located closer to the top surface of the substrate than is the first return path section, the middle shield being formed of a magnetic material, wherein the read head unit includes a first read shield layer, a magnetoresistive element and a second read shield layer which are arranged in this order, the first read shield layer being closest to the top surface of the substrate, the first and second read shield layers are both formed of a magnetic material, and at least part of the middle shield is located between the second read shield layer and the first return path section.

* * * * *